US011733932B2

(12) United States Patent
Lesartre et al.

(10) Patent No.: US 11,733,932 B2
(45) Date of Patent: Aug. 22, 2023

(54) DATA MANAGEMENT ON MEMORY MODULES

(71) Applicant: HEWLETT PACKARD ENTERPRISE DEVELOPMENT LP, Houston, TX (US)

(72) Inventors: Gregg B Lesartre, Fort Collins, CO (US); Andrew R Wheeler, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 224 days.

(21) Appl. No.: 14/912,681

(22) PCT Filed: Sep. 27, 2013

(86) PCT No.: PCT/US2013/062371
§ 371 (c)(1),
(2) Date: Feb. 18, 2016

(87) PCT Pub. No.: WO2015/047326
PCT Pub. Date: Apr. 2, 2015

(65) Prior Publication Data
US 2016/0202936 A1    Jul. 14, 2016

(51) Int. Cl.
*G06F 3/06* (2006.01)
*G06F 12/121* (2016.01)
(Continued)

(52) U.S. Cl.
CPC ............ *G06F 3/0685* (2013.01); *G06F 3/065* (2013.01); *G06F 3/0619* (2013.01); *G06F 12/08* (2013.01);
(Continued)

(58) Field of Classification Search
CPC .... G06F 3/0685; G06F 12/121; G06F 3/0619; G06F 12/1054; G06F 3/065;
(Continued)

(56) References Cited

U.S. PATENT DOCUMENTS 5,261,067 A * 11/1993 Whelan ............... G06F 12/0842
711/121
7,035,974 B2 * 4/2006 Shang ................. G06F 11/1076
711/113
(Continued)

FOREIGN PATENT DOCUMENTS

CN    102301345 A    12/2011
CN    102436419 A    5/2012
(Continued)

OTHER PUBLICATIONS

International Searching Authority, The International Search Report and the Written Opinion for PCT/US2013/062371 dated Jun. 25, 2014, 12 Pages.
(Continued)

*Primary Examiner* — David Yi
*Assistant Examiner* — Alan Otto
(74) *Attorney, Agent, or Firm* — Trop, Pruner & Hu, P.C.

(57) ABSTRACT

Example implementations relate to managing data on a memory module. Data may be transferred between a first NVM and a second NVM on a memory module. The second NVM may have a higher memory capacity and a longer access latency than the first NVM. A mapping between a first address and a second address may be stored in an NVM on the memory module. The first address may refer to a location at which data is stored in the first NVM. The second address may refer to a location, in the second NVM, from which the data was copied.

20 Claims, 6 Drawing Sheets

(51) Int. Cl.
  *G06F 12/1045* (2016.01)
  *G06F 12/08* (2016.01)
  *G06F 12/0802* (2016.01)
  *G06F 12/1009* (2016.01)
  *G06F 12/12* (2016.01)

(52) U.S. Cl.
  CPC ...... *G06F 12/0802* (2013.01); *G06F 12/1054* (2013.01); *G06F 12/121* (2013.01); *G06F 12/1009* (2013.01); *G06F 12/12* (2013.01); *G06F 2212/1021* (2013.01); *G06F 2212/222* (2013.01); *G06F 2212/60* (2013.01)

(58) Field of Classification Search
  CPC .. G06F 12/0802; G06F 12/08; G06F 2212/69; G06F 2212/60; G06F 2212/1021; G06F 2212/222; G06F 12/1009
  See application file for complete search history.

(56) References Cited

U.S. PATENT DOCUMENTS

| | | | |
|---|---|---|---|
| 8,156,288 | B2 | 4/2012 | Karamcheti et al. |
| 8,397,013 | B1 * | 3/2013 | Rosenband ........... G06F 13/385 365/205 |
| 8,959,281 | B1 * | 2/2015 | Malina ................ G06F 12/0246 711/117 |
| 2004/0093463 | A1 | 5/2004 | Shang |
| 2004/0117583 | A1 | 6/2004 | Arimilli et al. |
| 2008/0205150 | A1 | 8/2008 | Pesavento |
| 2009/0158085 | A1 * | 6/2009 | Kern ................... G06F 11/1064 714/6.13 |
| 2009/0248957 | A1 | 10/2009 | Tzeng |
| 2009/0249015 | A1 | 10/2009 | Tzeng |
| 2010/0057984 | A1 | 3/2010 | Chen et al. |
| 2010/0169604 | A1 | 7/2010 | Trika et al. |
| 2010/0293337 | A1 | 11/2010 | Murphy et al. |
| 2010/0312850 | A1 | 12/2010 | Deshpande |
| 2011/0141813 | A1 | 6/2011 | Ghodsi |
| 2013/0159597 | A1 * | 6/2013 | Cheong ............... G06F 12/0866 711/102 |
| 2014/0101389 | A1 * | 4/2014 | Nellans ............... G06F 12/0862 711/137 |

FOREIGN PATENT DOCUMENTS

| | | |
|---|---|---|
| CN | 102597910 A | 7/2012 |
| KR | 20110131714 | 12/2011 |
| KR | 20130063244 | 6/2013 |

OTHER PUBLICATIONS

Mogul, J.C. et al.; "Operating System Support for NVM+DRAM Hybrid Main Memory"; Apr. 20, 2009; 5 pages.
Ramos, L. et al.; "Page Placement in Hybrid Memory Systems"; May 31-Jun. 4, 2011; 11 pages.
European Search Report dated May 10, 2017 for EP Application No. 13894169.5; pp. 8.

* cited by examiner

DATA MANAGEMENT ON MEMORY MODULES

BACKGROUND

Hybrid memory modules, which may include a non-volatile memory (NVM) as well as a volatile memory, may store more data than memory modules whose memories are all volatile memories. Memory modules may communicate with external components via a double data rate (DDR) interface. A cache memory on a hybrid memory module may enable the memory module to comply with DDR interface timing requirements, as well as protect a low endurance NVM on the memory module from a large volume of write operations that may wear out the NVM.

BRIEF DESCRIPTION OF THE DRAWINGS

The following detailed description references the drawings, wherein.

DETAILED DESCRIPTION

A volatile memory may be used as a cache memory on a hybrid memory module. If the memory module loses power, data in the volatile cache memory may be lost. If data in the volatile cache memory was modified after being copied from a non-volatile memory (NVM) on the memory module, the NVM may not be able to obtain the modified data if power was lost before the modified data in the volatile cache memory was copied back to the NVM.

In light of the above, the present disclosure provides for a memory module having a non-volatile cache memory whose access time approaches that of a volatile cache memory. If power is removed from such a memory module, data in the cache memory is not lost, and another NVM on the memory module may be able to obtain modified data stored in the non-volatile cache memory after power is restored. A memory module having a non-volatile cache memory may also consume less power than a memory module having a volatile cache memory.

Figure 1:
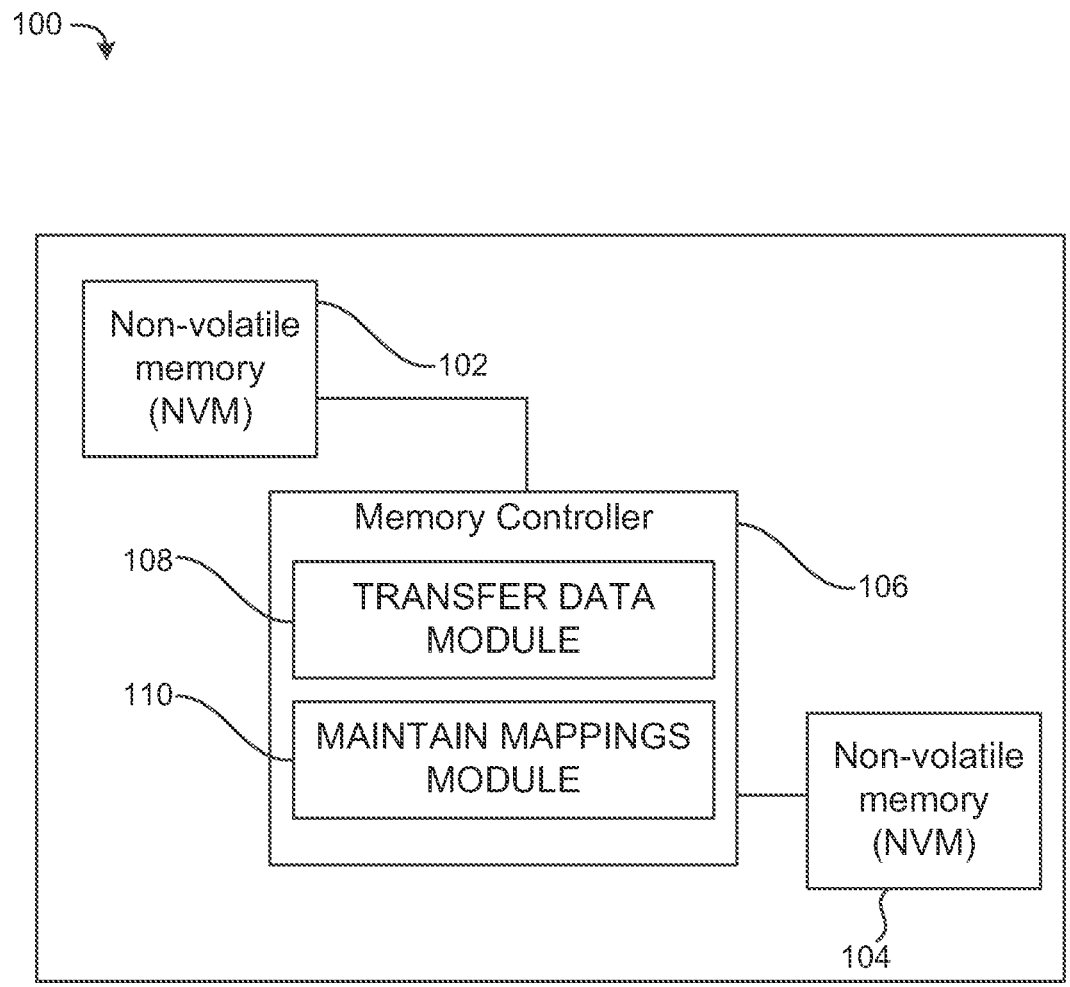
FIG. 1 is a block diagram of an example memory module that includes a memory controller to manage data on the memory module.

Referring now to the drawings, FIG. 1 is a block diagram of an example memory module 100 that includes a memory controller to manage data on the memory module. Memory module 100 may be an in-line memory module, such as a single in-line memory module (SIMM) or a dual in-line memory module (DIMM), or any memory module suitable for mounting memory integrated circuits (ICs). In FIG. 1, memory module 100 includes non-volatile memory (NVM) 102, NVM 104, and memory controller 106.

Each of NVMs 102 and 104 may include resistive random-access memory (ReRAM), flash memory, Electrically Erasable Programmable Read-Only Memory (EEPROM), magnetoresistive random-access memory (MRAM), phase-change random-access memory (PCRAM), or any other non-volatile memory suitable for storing executable instructions and/or data. The term "non-volatile memory", or "NVM", as used herein refers to a memory capable of retaining stored instructions/data even when not powered. NVMs 102 and 104 may be in ICs on memory module 100.

NVM 102 may have a higher memory capacity and a longer access latency than NVM 104. The term "access latency", as used herein with respect to a memory, refers to the length of time it takes to read data from or write data to the memory. In some implementations, NVM 102 may be a flash memory, and NVM 104 may be a ReRAM. NVM 104 may enable caching of active data for applications requesting to access data stored in NVM 102, and may allow data to be accessed at speeds that NVM 102 may not be able to achieve. NVM 104, functioning as a fast cache memory, may be transparent to components external to memory module 100.

Memory controller 106 may be communicatively coupled to NVMs 102 and 104 on memory module 100. In some implementations, memory controller 106 may be a digital circuit. As illustrated in FIG. 1 and described in detail below, memory controller 106 may include modules 108 and 110. A module may include a set of instructions encoded on a machine-readable storage medium and executable by a processor of memory controller 106. In addition or as an alternative, a module may include a hardware device comprising electronic circuitry for implementing the functionality described below.

Transfer data module 108 may transfer data between NVMs 102 and 104. In some implementations, transfer data module 108 may include a direct memory access (DMA) controller for controlling transfers between NVMs 102 and 104. Transfer data module 108 may include interfaces for transferring data to and receiving data from NVMs 102 and 104, and may include a buffer for storing data read from NVMs 102 and/or 104.

As discussed above, NVM 104 may function as a fast cache memory, and NVM 102 may be a slower, higher-capacity memory. Transfer data module 108 may receive information (e.g., via an operating system interface on memory controller 106) indicating that data requested by a component external to memory module 100 (such data may be referred to herein as "requested data") is not present in NVM 104. Transfer data module 108 may receive such information from an operating system (OS) page fault handler or may otherwise detect an absence of the requested data. The page fault handler may be invoked, for example, when memory controller 106 receives a request to access data stored at a virtual address referring to a location in NVM 102, and the virtual address does not have a valid entry in the OS page table. In response to the received information, transfer data module 108 may copy the requested data from NVM 102 to NVM 104.

It should be understood that data may be transferred between NVMs 102 and 104 in blocks of a different size than the size of a block of data sent to an external component. For example, transfer data module 108 may copy data page by page (e.g., a page may be about 4 kilobytes) from NVM 102 to NVM 104, and memory controller 106 may output data read from NVM 104 (e.g., requested data) in a cache line (e.g., about 64 bytes) to an external component.

Maintain mappings module 110 may maintain, on an NVM on memory module 100, a plurality of mappings between a first plurality of addresses, which may refer to locations in NVM 104, and a second plurality of addresses, which may refer to locations in NVM 102. Data may be transferred between the first plurality of addresses and the second plurality of addresses. The term "maintain", as used herein with respect to mappings and indications, refers to generating and/or storing new mappings/indications, updating existing mappings/indications, and deleting existing mappings/indications. For example, a new mapping may be stored when data is copied from NVM 102 to NVM 104, an indication may be updated when data stored in NVM 104 is modified (indications are discussed further with respect to FIG. 2), and a mapping may be deleted when a cache flush function is performed on NVM 104. It should be understood that memory module 100 may include NVMs other than NVMs 102 and 104, and that mappings may be maintained in one of the other NVMs.

The term "mapping", as used herein with respect to addresses, refers to information indicative of a relationship between two addresses between which data is transferred. In some implementations, a mapping may be an entry in a table used to track which data pages in NVM 102 are currently cached in NVM 104. The entry may include a physical address, referring to a location in NVM 102 where a particular page of data is stored, next to a virtual address, referring to a location in NVM 104 where the particular page of data is stored. In some implementations, a mapping may include an address referring to a location in NVM 104 and a pointer to a corresponding location in NVM 102.

Maintain mappings module 110 may store a mapping between a first address and a second address in response to requested data being copied from NVM 104 to NVM 102. The first address may be one of the first plurality of addresses, and may refer to a location at which the requested data is stored in NVM 104. The second address may be one of the second plurality of addresses, and may refer to a location, in NVM 102, from which the requested data was copied. The mapping may be stored, for example, in NVM 102, in NVM 104, or in a NVM in memory controller 106.

When the mappings are stored in a NVM on memory module 100, the mappings may remain in the NVM even if memory module 100 does not have power. When memory module 100 is powered up (e.g., after losing power or being powered down), transfer data module 108 may read the mappings and copy data stored at the first plurality of addresses in NVM 104 to respective addresses of the second plurality of addresses in NVM 102. Thus, if data in NVM 104 was modified (e.g., by a component external to memory module 100) before removal of power to memory module 100, NVM 102 may store the most current version of the data after power is restored. In some implementations, an OS may use the stored mappings to initialize a page table, for example when power is restored to memory module 100 after a power loss. The first plurality of addresses may be virtual addresses in the page table, and the second plurality of addresses may be physical addresses mapped to the respective virtual addresses in the page table.

Figure 2:
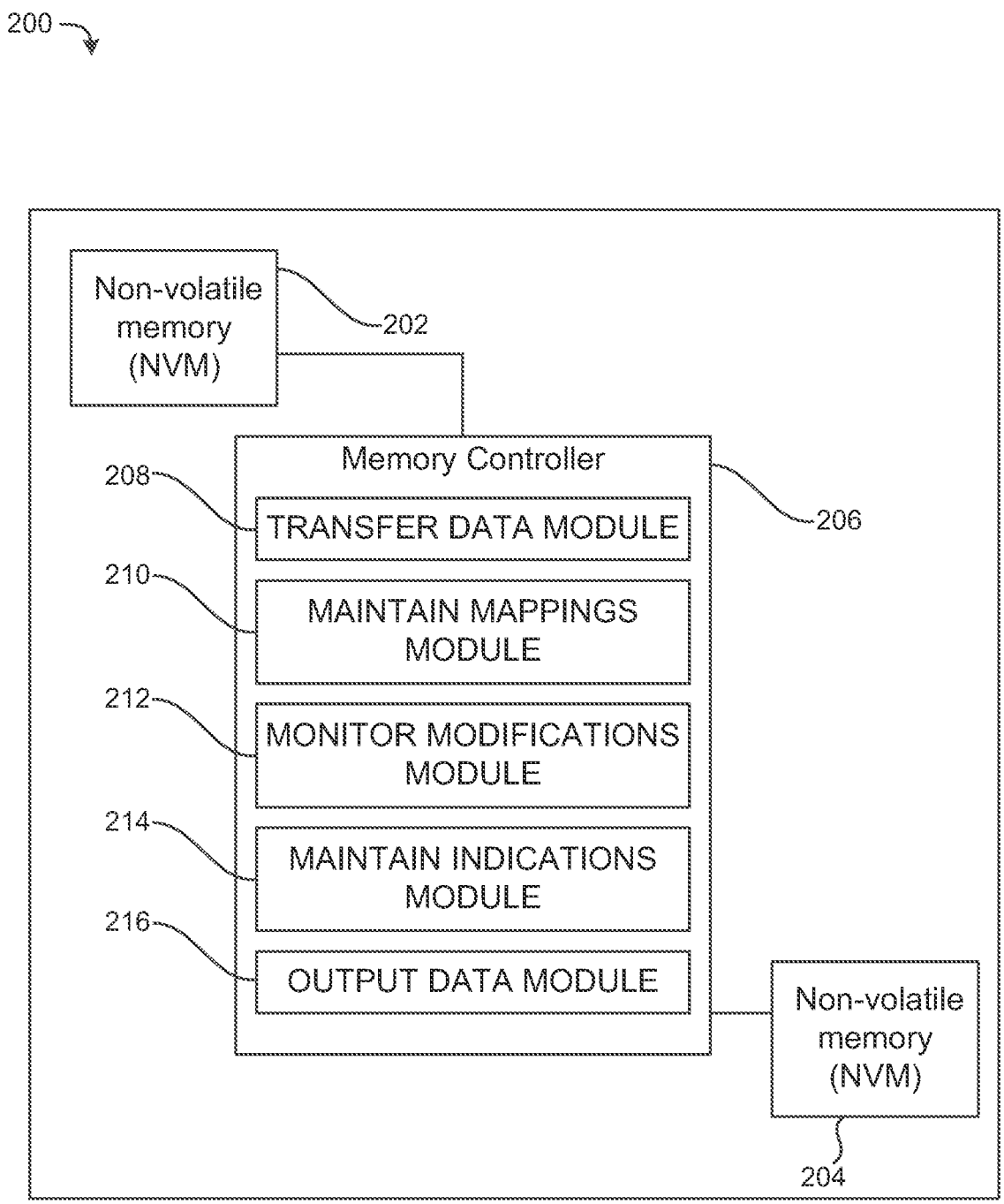
FIG. 2 is a block diagram of an example memory module that includes a memory controller to transfer data between non-volatile memories (NVMs) on the memory module and keep track of where data is stored in the NVMs.

FIG. 2 is a block diagram of an example memory module 200 that includes a memory controller to transfer data between NVMs on the memory module and keep track of where data is stored in the NVMs. Memory module 200 may be an in-line memory module, such as a SIMM or DIMM, or any memory module suitable for mounting memory ICs.

In FIG. 2, memory module 200 includes NVM 202, NVM 204, and memory controller 206. NVMs 202 and 204 may be analogous to (e.g., have functions and/or components similar to) NVMs 102 and 104, respectively, of FIG. 1.

Memory controller 206 may be communicatively coupled to NVMs 202 and 204 on memory module 200. In some implementations, memory controller 206 may be a digital circuit. As illustrated in FIG. 2 and described in detail below, memory controller 206 may include modules 208, 210, 212, 214, and 216. A module may include a set of instructions encoded on a machine-readable storage medium and executable by a processor of memory controller 206. In addition or as an alternative, a module may include a hardware device comprising electronic circuitry for implementing the functionality described below.

Modules 208 and 210 of memory controller 206 may be analogous to modules 108 and 110 of memory controller 106. Monitor modifications module 212 may monitor modifications of data pages in a fast cache memory (e.g., NVM 204) on memory module 200. Monitor modifications module 212 may detect write commands received by the fast cache memory and/or detect write operations performed in the fast cache memory. In some implementations, monitor modifications module 212 may determine whether valid data is stored at a particular address in the fast cache memory.

Maintain indications module 214 may maintain, in a NVM on memory module 200, indications of whether data pages in a fast cache memory on memory module 200 have been modified. For example, such indications may be stored in NVM 202, in NVM 204, or in a NVM in memory controller 206. The term "indication" as used herein refers to a symbol of whether a circumstance exists. In response to monitor modifications module 212 detecting a modification of a data page in the fast cache memory, maintain indications module 214 may store an indication that the data page has been modified. For example, maintain indications module 214 may set a dirty bit associated with the data page.

In some implementations, when power is restored to memory module 200 after a power loss, transfer data module 208 may copy, from NVM 204 to NVM 202, pages having an indication that they have been modified (e.g., pages whose respective dirty bits have been set). Transfer data module 208 may not copy pages not having an indication that they have been modified, or pages having an indication that they have not been modified (e.g., pages whose respective dirty bits have not been set). In some implementations, indications of whether pages have been modified may be used to determine which pages to copy from NVM 204 to NVM 202 before a de-allocation or cache flush operation is performed on NVM 204. Data pages in NVM 204 that have been modified may be copied to NVM 202 before execution of the de-allocation/cache flush operation so that modified data may be retained in memory module 200. Data pages in NVM 204 that have not been modified may be invalidated and not copied, thus saving the latency time and resources that would be expended to write the non-modified data to NVM 202.

In some implementations, maintain indications module 214 may maintain, in a NVM on memory module 200, indications of whether respective pages of data in NVM 202 are stored in NVM 204. Such indications may be used to track active pages and availability of data in NVM 204. Indications of whether respective pages of data in NVM 202 are stored in NVM 204 may be stored, for example, in NVM 202, in NVM 204, or in a NVM in memory controller 206, and may be stored in the same NVM as or a different NVM from the NVM used to store indications of whether pages have been modified.

In some implementations, maintain indications module 214 may maintain, in a NVM on memory module 200, indications of whether valid data is stored at respective addresses referring to locations in a fast cache memory (e.g., NVM 204) of memory module 200. Such indications may be used to determine addresses in the fast cache memory to which data may be written, and how much free storage space exists in the fast cache memory. Indications of whether valid data is stored at respective addresses may be stored, for example, in NVM 202, in NVM 204, or in a NVM in memory controller 206, and may be stored in the same NVM as or a different NVM from the NVM(s) used to store previously discussed indications.

Output data module 216 may transmit data read from NVMs 202 and/or 204 to a component external to memory module 200. Output data module 216 may transmit requested data to an external component that requested the data. The data may be output in a cache line.

Figure 3:
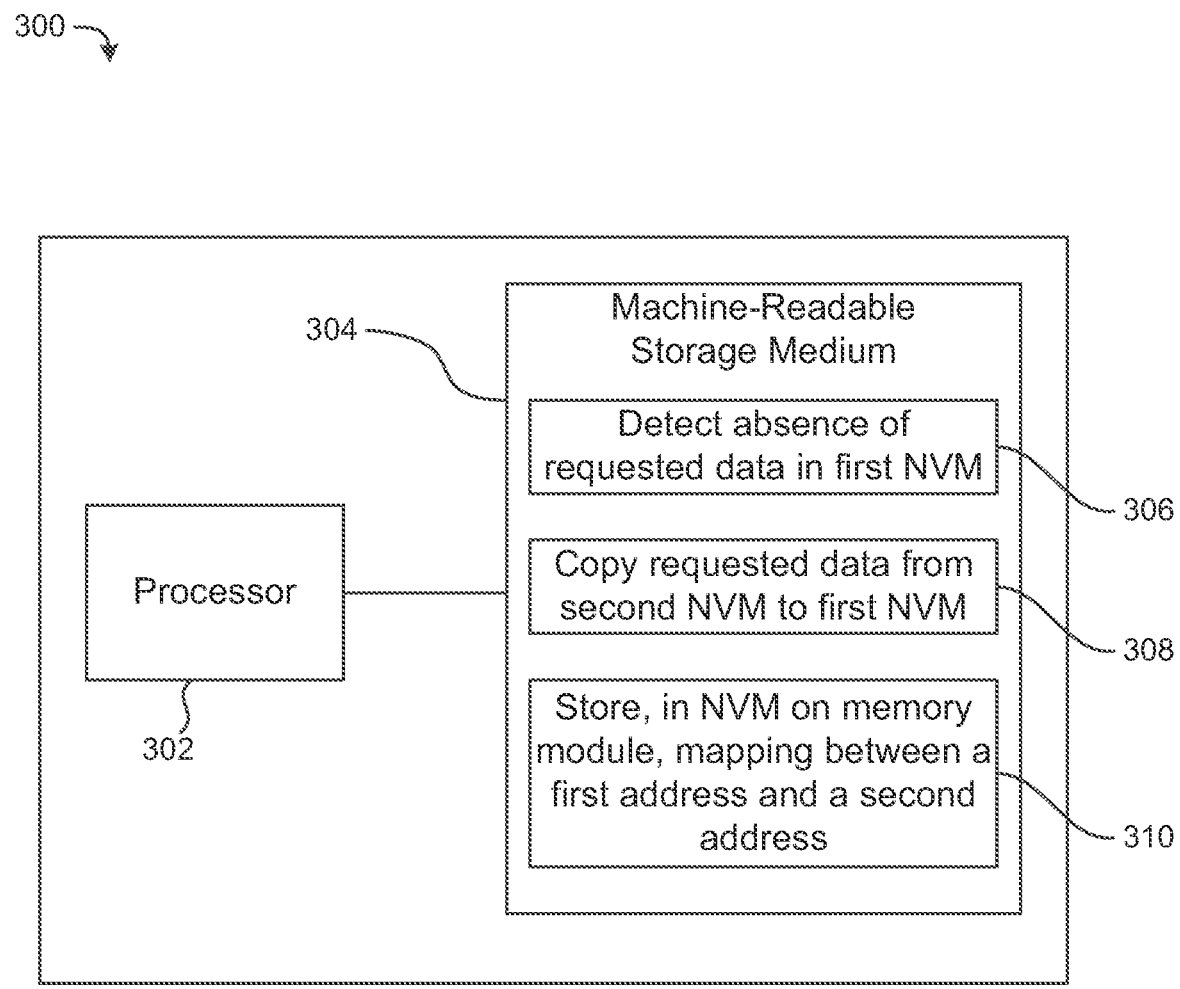
FIG. 3 is a block diagram of an example memory module that includes a machine-readable storage medium encoded with instructions that enable management of data on the memory module.

FIG. 3 is a block diagram of an example memory module 300 that includes a machine-readable storage medium encoded with instructions that enable management of data on the memory module. Memory module 300 may be an in-line memory module, such as a SIMM or DIMM, or any memory module suitable for mounting memory ICs. In FIG. 3, memory module 300 includes processor 302 and machine-readable storage medium 304.

Processor 302 may include a central processing unit (CPU), microprocessor (e.g., semiconductor-based microprocessor), and/or other hardware device suitable for retrieval and/or execution of instructions stored in machine-readable storage medium 304. Processor 302 may fetch, decode, and/or execute instructions 306, 308, and 310 to enable management of data on memory module 300, as described below. As an alternative or in addition to retrieving and/or executing instructions, processor 302 may include an electronic circuit comprising a number of electronic components for performing the functionality of instructions 306, 308, and/or 310.

Machine-readable storage medium 304 may be any suitable electronic, magnetic, optical, or other physical storage device that contains or stores executable instructions. Thus, machine-readable storage medium 304 may include, for example, a random-access memory (RAM), an EEPROM, a storage device, an optical disc, and the like. In some implementations, machine-readable storage medium 304 may include a non-transitory storage medium, where the term "non-transitory" does not encompass transitory propagating signals. As described in detail below, machine-readable storage medium 304 may be encoded with a set of executable instructions 306, 308, and 310.

Instructions 306 may detect the absence of requested data in a first NVM on memory module 300. The first NVM may be a fast cache memory (e.g., NVM 104), as discussed above with respect to FIG. 1. In some implementations, instructions 306 may receive information from an OS page fault handler indicating that the requested data is not stored in the first NVM. The page fault handler may be invoked, for example, when access is desired to data stored in memory module 300 at a virtual address that does not have a valid entry in the OS page table.

Instructions 308 may copy the requested data from a second NVM (e.g., NVM 102) on memory module 300 to the first NVM. The second NVM may have a higher memory capacity and a longer access latency than the first NVM, as discussed above with respect to FIG. 1. The requested data may be copied from the second NVM to the first NVM in response to a detected absence of requested data in the first NVM. For example, the requested data may be copied when an OS page fault handler is invoked. In some implementations, data may be copied page by page from the second NVM to the first NVM.

Instructions 310 may store, in a NVM on memory module 300, a mapping between a first address and a second address. The first address may refer to a location at which the requested data is stored in the first NVM. The second address may refer to a location, in the second NVM, from which the requested data was copied. In some implementations, the mapping may include an entry of physical and virtual addresses in a table, and/or a pointer, as discussed above with respect to FIG. 1. The mapping may be stored in response to requested data being copied from an NVM on memory module 300 to another NVM on memory module 300 (e.g., from the second NVM to the first NVM). The mapping may be stored, for example, in the first NVM, in the second NVM, or in a NVM in a memory controller on memory module 300.

Figure 4:
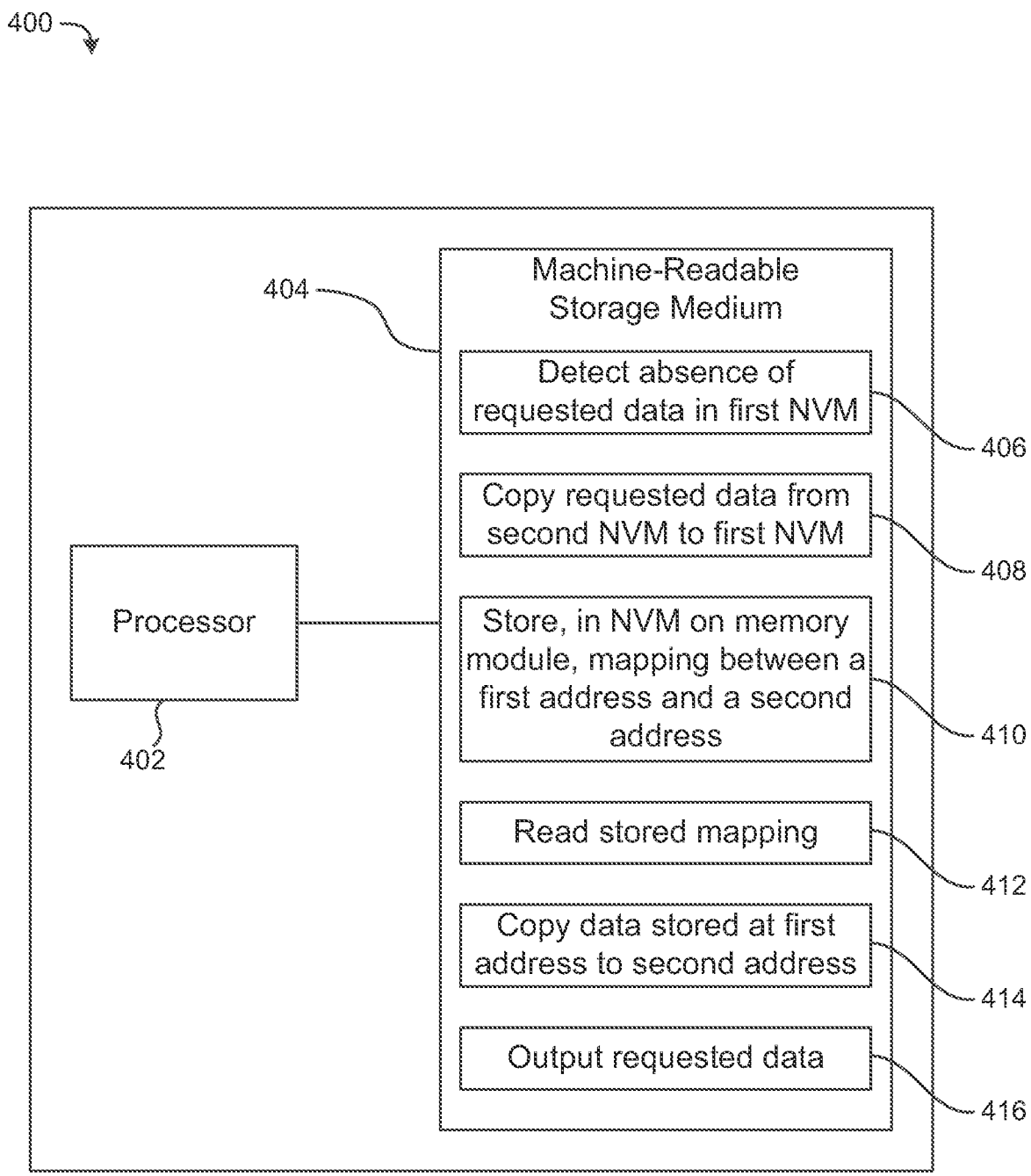
FIG. 4 is a block diagram of an example memory module that includes a machine-readable storage medium encoded with instructions to move and track data on the memory module.

FIG. 4 is a block diagram of an example memory module 400 that includes a machine-readable storage medium encoded with instructions to move and track data on the memory module. Memory module 400 may be an in-line memory module, such as a SIMM or DIMM, or any memory module suitable for mounting memory ICs. In FIG. 4, memory module 400 includes processor 402 and machine-readable storage medium 404.

As with processor 302 of FIG. 3, processor 402 may include a CPU, microprocessor (e.g., semiconductor-based microprocessor), and/or other hardware device suitable for retrieval and/or execution of instructions stored in machine-readable storage medium 404. Processor 402 may fetch, decode, and/or execute instructions 406, 408, 410, 412, 414, and 416 to enable movement and tracking of data on memory module 400, as described below. As an alternative or in addition to retrieving and/or executing instructions, processor 402 may include an electronic circuit comprising a number of electronic components for performing the functionality of instructions 406, 408, 410, 412, 414, and/or 416.

As with machine-readable storage medium 304 of FIG. 3, machine-readable storage medium 404 may be any suitable physical storage device that stores executable instructions. Instructions 406, 408, and 410 on machine-readable storage medium 404 may be analogous to instructions 306, 308, and 310 on machine-readable storage medium 304. Instructions 412 may read a stored mapping from a memory on memory module 400. For example, a stored mapping may be read from a fast cache NVM (e.g., NVM 204), a high capacity and slow access time NVM (e.g., NVM 202), or a NVM in a memory controller on memory module 400. In some implementations, the stored mapping may be read when memory module 400 is powered up after a power loss, and/or may be used by an OS to initialize a page table, as discussed above with respect to FIG. 1.

Instructions 414 may copy data stored at a first address to a second address in memory module 400. The first address may refer to a location of data in a fast cache NVM on memory module 400. The second address may refer to a location, in a higher capacity/longer access latency NVM on memory module 400, from which the data was copied. In some implementations, the first address may be a virtual address and the second address may be a physical address in a stored mapping, and the data may be copied after the stored mapping is read on power up of memory module 400. Thus, the slower NVM may store the most current data, as discussed above with respect to FIG. 1.

Instructions 416 may output requested data from memory module 400. For example, a memory controller (e.g., memory controller 206) on memory module 400 may output requested data read from a memory (e.g., fast cache memory) on memory module 400 to a component external to memory module 400. The requested data may be output in a cache line, as discussed above with respect to FIG. 1.

Figure 5:
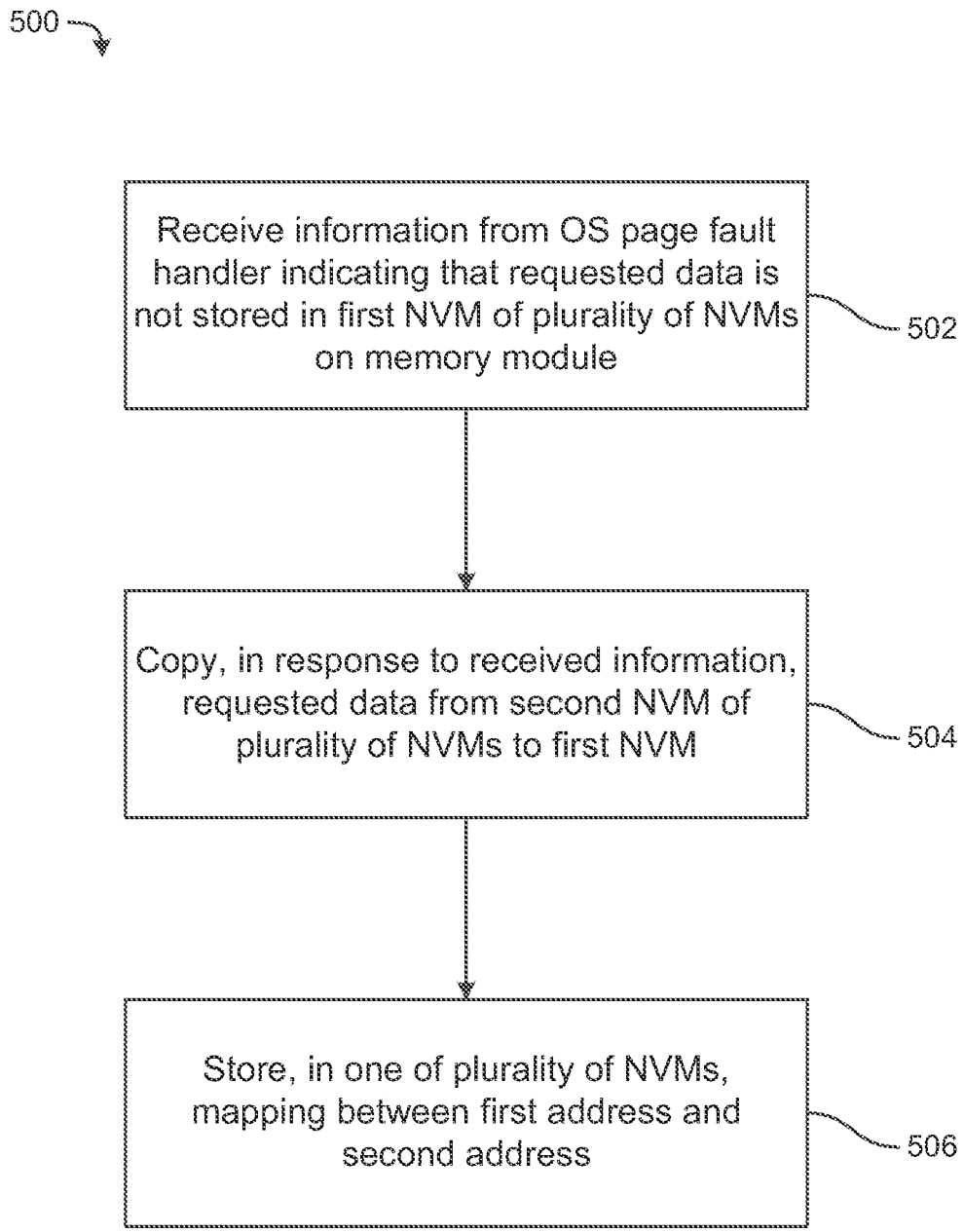
FIG. 5 is a flowchart of an example method for managing data on a memory module.

FIG. 5 is a flowchart of an example method 500 for managing data on a memory module. Although execution of method 500 is described below with reference to processor 302 of FIG. 3, it should be understood that execution of method 500 may be performed by other suitable devices, such as processor 402 of FIG. 4. Method 500 may be implemented in the form of executable instructions stored on a machine-readable storage medium (e.g., storage medium 304) and/or in the form of electronic circuitry.

Method 500 may start in block 502, where processor 302 may receive information from an OS page fault handler indicating that requested data is not stored in a first NVM of a plurality of NVMs on a memory module. The first NVM may be a fast cache memory, such as NVM 104 of FIG. 1. The page fault handler may be invoked, for example, when access is desired to data stored in a memory controller on the memory module at a virtual address referring to a location in the first NVM, and the virtual address does not have a valid entry in the OS page table.

Next, in block 504, processor 302 may copy, in response to the received information, requested data from a second NVM of the plurality of NVMs to the first NVM. The second NVM may have a higher memory capacity and a longer access latency than the first NVM. For example, the first NVM may be a ReRAM and the second NVM may be a flash memory. The requested data may be copied page by page from the second NVM to the first NVM.

Finally, in block 506, processor 302 may store, in one of the plurality of NVMs on the memory module, a mapping between a first address and a second address. The first address may refer to a location at which the requested data is stored in the first NVM. The second address may refer to a location, in the second NVM, from which the requested data was copied. The mapping may include an entry of physical and virtual addresses in a table, and/or a pointer, as discussed above with respect to FIG. 1. In some implementations, the mapping may be stored in response to requested data being copied from the second NVM to the first NVM on the memory module. The mapping may be stored, for example, in the first NVM, in the second NVM, or in a NVM in a memory controller on the memory module.

Figure 6:
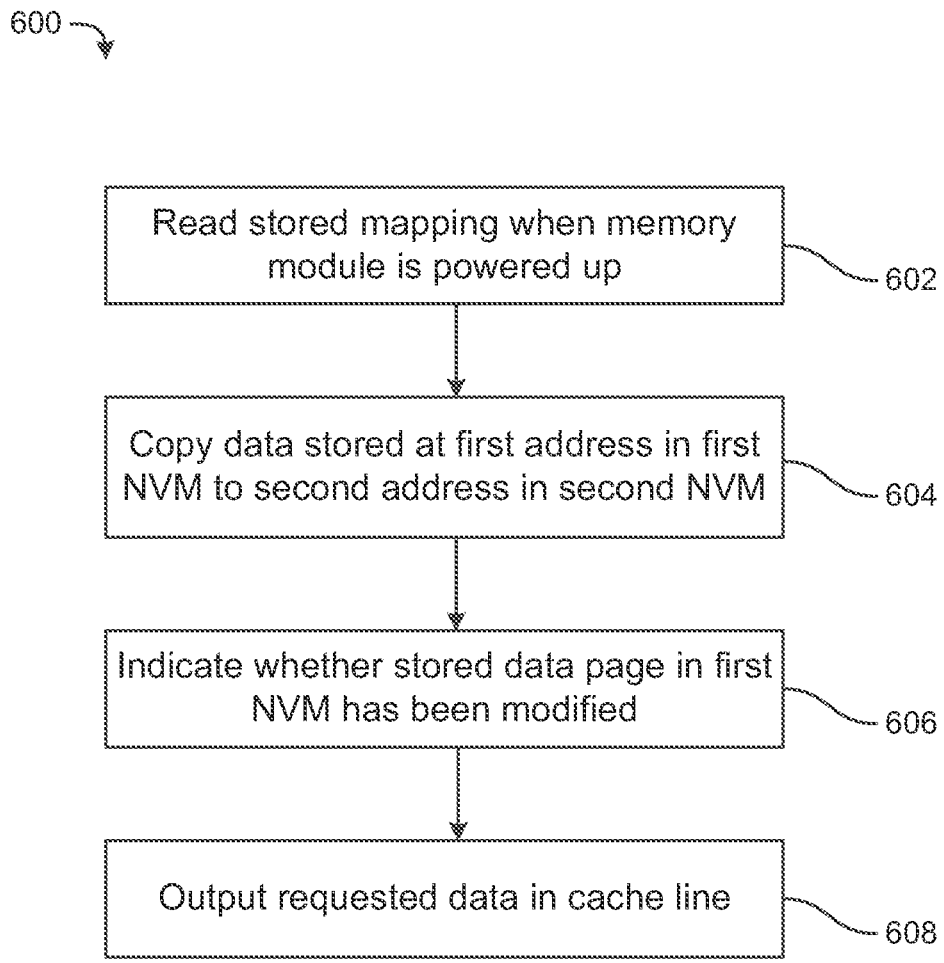
FIG. 6 is a flowchart of an example method for maintaining details related to data stored on a memory module.

FIG. 6 is a flowchart of an example method 600 for maintaining details related to data stored on a memory module. Although execution of method 600 is described below with reference to processor 402 of FIG. 4, it should be understood that execution of method 600 may be performed by other suitable devices, such as processor 302 of FIG. 3. Method 600 may be implemented in the form of executable instructions stored on a machine-readable storage medium (e.g., storage medium 404) and/or in the form of electronic circuitry.

Method 600 may start in block 602, where processor 402 may read a stored mapping when a memory module is powered up. The mapping may be read from a NVM on the memory module. For example, the mapping may be read from a fast cache NVM, a high capacity/slow access time NVM, or a NVM in a memory controller on the memory module. The mapping may include a first address and a second address. The first address may refer to a location at which data is stored in a first NVM (e.g., fast cache NVM) on the memory module. The second address may refer to a location, in a second NVM (e.g., high capacity/slow access time NVM) on the memory module, from which the data was copied. In some implementations, the mapping may be used to initialize an OS page table, as discussed above with respect to FIG. 1. In such implementations, the first address may be a virtual address in the page table, and the second address may be a physical address mapped to the virtual address in the page table.

Next, in block 604, processor 402 may copy data stored at the first address in the first NVM to the second address in the second NVM. In implementations where the first NVM functions as a fast cache memory with respect to the second NVM, such copying may allow the second NVM to store the most current version of data after power is restored to the memory module, even if data in the first NVM was modified before removal of power to the memory module, as discussed above with respect to FIG. 1. Data may be copied page by page from the first NVM to the second NVM.

In block 606, processor 402 may indicate whether a stored data page in the first NVM has been modified. Processor 402 may indicate a modification in response to detecting a write command being sent to, or a write operation being performed on, the first NVM. In some implementations, processor 402 may set a dirty bit associated with a data page to indicated that the data page has been modified, as discussed above with respect to FIG. 2.

In block 608, processor 402 may output requested data in a cache line. The requested data may be read from the first NVM and transmitted to a component external to the memory module. Although block 608 is shown below block 606 in FIG. 6, it should be understood that processor 402 may output requested data before or in parallel with indicating whether stored data has been modified.

The foregoing disclosure describes memory modules having a non-volatile fast cache memory and a higher capacity, slower access time NVM. Example implementations described herein enable memory modules to retain data after power losses and track locations of data without having to rely on an OS.

We claim:

1. A method for managing data on a memory module, the method comprising:
   receiving, at the memory module, a request for a piece of data from a requester external of the memory module, the request indicating that the piece of data is not stored in a first non-volatile memory (NVM) on the memory module;
   in response to the request from the requester:
      copying the piece of data to a first memory address of the first NVM on the memory module from a second memory address of a second NVM on the memory module, wherein the first memory address refers to a location of the piece of data in the first NVM, and the second memory address refers to a location of the piece of data in the second NVM, and wherein the second NVM has a higher memory capacity and a longer access latency than the first NVM, and
      generating and storing, in the first NVM, a mapping between the first memory address of the first NVM and the second memory address of the second NVM for the piece of data; and in response to a power cycle of the memory module:
determining that a current version of the piece of data is not stored at the second memory address of the second NVM, and
copying the current version of the piece of data from the first memory address of the first NVM as specified by the mapping to the second memory address of the second NVM as specified by the mapping.

2. The method of claim 1, wherein the first NVM comprises a resistive random-access memory (ReRAM), a magnetoresistive random-access memory (MRAM), or a phase-change random-access memory (PCRAM).

3. The method of claim 1, wherein the copying of the current version of the piece of data from the first NVM to the second NVM comprises copying a page comprising the current version of the piece of data via a cache line of the memory module.

4. The method of claim 1, further comprising including, in the mapping, an indication that the piece of data in the first NVM has been modified, wherein the determining that the current version of the piece of data is not stored at the second memory address of the second NVM is based on the indication.

5. The method of claim 1, wherein the requester is an operating system (OS) page fault handler, and the request is responsive to a page fault indicating that a virtual address for the piece of data is without a valid entry in an OS page table, the method further comprising:
outputting, from the memory module in response to the power cycle of the memory module, the mapping to populate an entry of the OS page table to map the virtual address for the piece of data to a physical address for the piece of data.

6. The method of claim 1, wherein the copying of the current version of the piece of data from the first NVM to the second NVM is performed before a de-allocation or cache flush operation on the first NVM.

7. The method of claim 5, further comprising:
in response to receiving a request for the piece of data based on a virtual address, invoking the OS page fault handler that searches for the virtual address in the OS page table;
determining that the virtual address does not have a valid entry in the OS page table; and
issuing, by the OS page fault handler, the request to the memory module.

8. The method of claim 5, comprising:
in response to recovery of power at a system including the memory module, initializing the OS page table using the mapping.

9. A non-transitory machine-readable storage medium storing instructions that upon execution cause a system to:
in response to receiving, at a memory module, a request for a piece of data from a requester external of the memory module, the request indicating that the piece of data is not stored in a first non-volatile memory (NVM) on the memory module:
copy the piece of data to a first memory address of the first NVM on the memory module from a second memory address of a second NVM on the memory module, wherein the first memory address refers to a location of the piece of data in the first NVM, and the second memory address refers to a location of the piece of data in the second NVM, and wherein the second NVM has a higher memory capacity and a longer access latency than the second NVM; and
generate and store, in the first NVM, a mapping between the first memory address of the first NVM and the second memory address of the second NVM for the piece of data; and
in response to a power cycle of the memory module:
determine that a current version of the piece of data is not stored at the second memory address of the second NVM, and
copy the current version of the piece of data from the first memory address of the first NVM as specified by the mapping to the second memory address of the second NVM as specified by the mapping.

10. The non-transitory machine-readable storage medium of claim 9, wherein the instructions upon execution cause the system to:
copy a page comprising the current version of the piece of data from the first NVM to the second NVM via a cache line of the memory module.

11. The non-transitory machine-readable storage medium of claim 9, wherein the instructions upon execution cause the system to:
maintain first indications of which pieces of data in the first NVM are modified, and maintain second indications of which pieces of data in the first NVM are unmodified,
wherein the determining that the current version of the piece of data is not stored at the second memory address of the second NVM is based on the first indications.

12. The non-transitory machine-readable storage medium of claim 9, wherein the first NVM comprises a resistive random-access memory (ReRAM), a magnetoresistive random-access memory (MRAM), or a phase-change random-access memory (PCRAM).

13. The non-transitory machine-readable storage medium of claim 9, wherein the instructions upon execution cause the system to include, in the mapping, an indication that the piece of data has been modified, wherein the determining that the current version of the piece of data is not stored at the second memory address of the second NVM is based on the indication.

14. The non-transitory machine-readable storage medium of claim 9, wherein the requester is an operating system (OS) page fault handler, and the request is responsive to a page fault indicating that a virtual address for the piece of data is without a valid entry in an OS page table, and wherein the instructions upon execution cause the system to:
output, from the memory module in response to the power cycle of the memory module, the mapping to populate an entry of the OS page table to map the virtual address for the piece of data to a physical address for the piece of data.

15. The non-transitory machine-readable storage medium of claim 14, wherein the instructions upon execution cause the system to:
in response to receiving a request for the piece of data based on a virtual address, invoke the OS page fault handler to search for the virtual address in the OS page table;
determine that the virtual address does not have a valid entry in the OS page table; and
issue, by the OS page fault handler, the request to the memory module.

16. A memory module comprising:
a plurality of non-volatile memories (NVMs) comprising a first NVM and a second NVM having a higher memory capacity and a longer access latency than the first NVM; and
a memory controller to:
  receive, at the memory controller, a request for a piece of data from a requester external of the memory module, the request indicating that the piece of data is not stored in the first NVM;
  in response to the request from the requester:
    copy the piece of data to a first memory address of the first NVM from a second memory address of the second NVM, wherein the first memory address refers to a location of the piece of data in the first NVM, and the second memory address refers to a location of the piece of data in the second NVM, and
    generate and store, in the first NVM, a mapping between the first memory address of the first NVM and the second memory address of the second NVM for the piece of data; and
  in response to a power cycle of the memory module:
    determine that a current version of the piece of data is not stored at the second memory address of the second NVM, and
    copy the current version of the piece of data from the first memory address of the first NVM as specified by the mapping to the second memory address of the second NVM as specified by the mapping.

17. The memory module of claim 16, wherein the first NVM comprises a resistive random-access memory (ReRAM), a magnetoresistive random-access memory (MRAM), or a phase-change random-access memory (PCRAM).

18. The memory module of claim 16, wherein the memory controller is further to:
  store an indication, in the mapping, whether the piece of data in the first NVM has been modified, wherein the determining that the current version of the piece of data is not stored at the second memory address of the second NVM is based on the indication.

19. The memory module of claim 16, wherein the memory controller is further to:
  copy a page comprising the current version of the piece of data from the first NVM to the second NVM via a cache line of the memory module.

20. The memory module of claim 16, wherein the requester is an operating system (OS) page fault handler, and the request is responsive to a page fault indicating that a virtual address for the piece of data is without a valid entry in an OS page table, and wherein the memory controller is to:
  output, from the memory module in response to the power cycle of the memory module, the mapping to populate an entry of the OS page table to map the virtual address for the piece of data to a physical address for the piece of data.

* * * * *